United States Patent [19]
Sugiyama

[11] Patent Number: 5,365,307
[45] Date of Patent: Nov. 15, 1994

[54] IMAGE PROJECTING APPARATUS
[75] Inventor: Kazuhide Sugiyama, Tokyo, Japan
[73] Assignee: Canon Kabushiki Kaisha, Tokyo, Japan
[21] Appl. No.: 45,226
[22] Filed: Apr. 13, 1993
[30] Foreign Application Priority Data
Apr. 24, 1992 [JP] Japan .................. 4-131925
[51] Int. Cl.⁵ .............................. G03B 13/28
[52] U.S. Cl. ..................................... 355/45
[58] Field of Search ............... 355/27, 43, 45, 51, 355/65, 66

[56] References Cited
U.S. PATENT DOCUMENTS
4,589,767  5/1986  Yanagi et al. ............... 355/45
4,969,009 11/1990  Sugiyama et al. ........... 355/64

FOREIGN PATENT DOCUMENTS
1125552  6/1982  Canada .

Primary Examiner—Richard A. Wintercorn
Attorney, Agent, or Firm—Fitzpatrick, Cella, Harper & Scinto

[57] ABSTRACT

An image projection apparatus switchable between a reader mode in which an image is projected on a screen for observation and a printer mode in which an exposure position is scan exposed to the image for obtaining a copied image comprises a support member for supporting two scanning mirrors in a mutually perpendicular manner, and a transport member for supporting and transporting the support member for scanning exposure. An arc-shaped guide portion is provided on the support member or on the transport member, whereby the support member can effect a rotating motion on the transport member, about the crossing point of the two scanning mirrors, and the scanning mirrors effect a rotating motion combined with a linear motion at the scanning exposure.

19 Claims, 13 Drawing Sheets

IMAGE PROJECTING APPARATUS

BACKGROUND OF THE INVENTION

1. Field of the Invention

The present invention relates to an image projecting apparatus for projecting an image onto an exposure position, and more particularly to an image copying apparatus which can be switched between a reader mode in which the image is projected onto a screen for observation and a printer mode in which said image is projected onto an exposure position in scanning motion by means of two scanning mirrors thereby obtaining a copied image.

2. Related Background Art

There is already known a micro reader/printer, which projects a microfilm image in magnified manner on a screen for observation and provides a copied print of said image when necessary.

FIGS. 15 and 16 illustrate an example of the conventional reader/printer, respectively showing the states of an optical system in reader mode and printer mode.

In FIG. 15, the reader/printer contains a lower casing 1, an upper casing 2 and a space portion 3 therebetween.

The lower casing 1 incorporates a film illuminating unit 4 including an illuminating lamp 5, a spherical mirror 6, an illuminating light reflecting mirror 7, a condenser lens 8 etc., and a printer mechanism 9.

Said printer mechanism 9 is comprised of, for example, an electrophotographic copying mechanism including an electrophotographic rotary photosensitive drum 10, a sheet cassette 11, copying sheets 12 contained in said cassette 11, a sheet feeding roller 13, a sheet guide member 14, paired registration rollers 15, a slit plate 16, paired fixing rollers 17, and a discharged sheet tray 18. Around the photosensitive drum, there are provided known image forming process units such as a charger, a developing station, a transfer unit, a cleaning unit etc., though they are omitted from the illustration.

The space portion 3 contains a rolled microfilm guiding mechanism or a microfiche carrier (not shown), a projection lens 19 etc. A microfilm F is set in said roller microfilm guiding mechanism or the microfiche carrier. An image rotating prism 20 is provided at the exit side of the projection lens 19.

The upper casing 2 is provided with a screen 21 at the front side thereof, and contains thereon two reader mirrors 23, 24 for guiding the upward emerging light from said projection (imaging) lens 19 and the prism 20 to the rear face of said screen 21, a movable scanning case 26, and two scanning (printing) mirrors 27, 28 supported mutually rectangularly in said scanning case 26.

In this example, the screen 21 is suspended, rotatably about an axis 22 at the upper edge thereof.

The first reader mirror 23 is fixed, while the second reader mirror 24 is rotatable about a shaft 25.

For scanning exposure of the image, the scanning case 26 is moved, by unrepresented guiding and driving means, in directions a, b (perpendicular to the optical axis from the projection lens 19 to the first fixed reader mirror 23) in the upper casing 2.

In the reader mode state shown in FIG. 15, the scanning case 26 is retained in a home position, behind the second reader mirror 24 at the back of the upper casing 2. The second reader mirror 24 is maintained at an illustrated angular position for reflecting the image bearing light from the first fixed reader mirror 23 to the rear face of the screen 21.

In said reader mode, a desired image frame of the microfilm F, retrieved and positioned above the condenser lens 8 of the film illuminating unit 4, is illuminated from below by said film illuminating unit 4, and the light transmitted by said image frame enters the projection lens 19, then guided through the prism 20, the first reader mirror 23, and the second reader mirror 24 and projected onto the rear face of the screen 21, whereby the magnified image of said image frame of the microfilm is formed on said screen and can be observed from the front side thereof.

The projected image on the screen 21 can be rotated by an arbitrary angle, by the rotation of the prism 20.

For obtaining a copied print of the image projected on the screen 21, an unrepresented print key is actuated whereby the apparatus assumes the printer mode.

More specifically, in response to a print start signal, the printer mechanism 9 is activated, and the scanning case 26 is advanced in a direction a from the home position shown in FIG. 15 to an exposure start position shown by solid lines in FIG. 16. Pushed by the advancing scanning case 26, the second reader mirror 24 rotates clockwise about the shaft 25 and escapes from the path of scanning case 26.

When said scanning case 26 reaches the exposure start position represented by solid lines in FIG. 16, it is reversed in a direction b with a predetermined scanning speed with unrepresented clutch means.

With said reverse displacement of the scanning case 26, the image bearing light emerging from the projection lens 19 and the prism 20 is scanned by the first print mirror 27, and thus scanned light is reflected by the second print mirror 28 and enters the rotary photosensitive drum 10 through the slit of the slit plate 16 of the printer mechanism 9, thereby effecting scanning exposure by the image bearing light on said rotary photosensitive drum 10. Thus the copying operation is conducted by the printer mechanism 9 to provide an enlarged copy of the desired frame of the microfilm F, and said copy is discharged on the tray 18.

The scanning exposure of the image bearing light onto the rotary photosensitive drum 10 is conducted until the scanning case 26 reaches an exposure end position shown by double-dotted chainlines in FIG. 16.

After reaching said exposure end position, the scanning case 26 continues the reverse displacement until it is stopped at the home position shown in FIG. 15.

With the returning of the scanning case 26 to the home position, the second reader mirror 24 is released from its upshifted position caused by said scanning case 26 and returns to the original angular position in the reader mode, shown in FIG. 15.

The direction of the image formed on the sheet 12 can be rotated by an arbitrary angle, by the rotation of the prism 20. Also it is possible to replace the photosensitive drum 10 in the scanning exposure position in the printer mode with a linear image sensor (for example CCD) for photoelectrically reading the image information and to obtain a copy by a laser beam printer based on the output of said image sensor.

SUMMARY OF THE INVENTION (a) In the reader/printer of the above-explained optical configuration, the amount of displacement of the scanning case 26 required for scanning exposure in the printer mode is a half of the length of the image. As an example, a displacement of 150 mm is required for copying the image of A4 size.

In the above-explained optical configuration, in order to copy the image onto a full A4 size, the front end of the scanning case 26, advanced to the exposure start position, collides with the screen 21.

In the above-explained example, this drawback is prevented by rotatably suspending the screen 21 by the shaft 22 at the upper edge thereof, whereby the screen 21 escapes to the front when it is pushed by the scanning case 26 by the forward displacement thereof to the exposure start position.

However such vibration of the screen in the printer mode, namely the escaping motion to the front and the returning motion to the original position, gives an uneasy and unpleasant feeling to the user.

On the other hand, if the screen is positioned further in front in order to avoid the interference between the scanning case 26 and the screen 21, the projection lens 19 must be positioned correspondingly deeper in the apparatus, thus rendering the focusing and other operations more difficult.

Consequently, a first object of the present invention is to provide an image projection apparatus of this sort, in which the drawback of interference of the scanning case 26 with the screen 21 is resolved without placing the screen in a further front position.

(b) The above-explained scanning exposure method requires a high precision of surface finishing on the first and second print mirrors 27, 28, because, at an end portion of the image, even a slight distortion on the reflecting face of the mirrors deteriorates the image quality, as the optical path is reflected by a blunt angle by the mirrors 27, 28 as indicated by A and B.

On the other hand, in the central portion of the image, the light is reflected with an acute angle, and is therefore less affected by the surface precision of the mirrors. For this reason, the image quality becomes uneven within a same copied image unless the surface precision of the mirrors is made extremely high, and the image becomes unpleasant to observe.

Consequently, a second object of the present invention is to provide an image projection apparatus capable of preventing the image deterioration and the uneven image quality within a same copied image, resulting from the surface precision of the print (scanning) mirrors 27, 28, thereby providing a copied image of high quality.

(c) In the above-explained reader/printer, since the scanning case 26 pushes the second reader mirror 24 in the course of the scanning exposure, there results drawbacks such that:

(1) the movement of the scanning case 26 becomes uneven due to the load required for the rotation of the mirror 24, thus undesirably affecting the copied image; and (2) vibration or fluctuation in load is generated unless the rotating part of the shaft 25 of said mirror 24 is finished considerably smoothly, thus affecting the movement of the scanning case 26 and deteriorating the copied image. For avoiding these drawbacks, it has been necessary to employ a large motor capable of withstanding the fluctuation in load and a highly precise bearing for the shaft 25, or to rotate said mirror 24 with another driving source. Such method however leads to an increased dimension, a complex structure and an increased cost of the apparatus.

Consequently, a third object of the present invention is to avoid, in the image projection apparatus of the above-explained sort, the drawbacks of unevenness in movement, vibration and fluctuating load of the scanning case 26 without the use of another driving source for the second reader mirror, or of a large motor for the driving source and a highly precise bearing for the shaft of said mirror, thereby simplifying the apparatus, reducing the cost thereof and improving the reliability thereof.

The foregoing objects can be attained, according to the present invention, by an image projection apparatus capable of being switched between a reader mode in which an image is projected on a screen for observation, and a printer mode in which an exposure unit is scan exposed to said image by means of two scanning mirrors thereby obtaining a copied image, comprising:

a support member for supporting said two scanning mirrors in such a manner that the reflecting faces thereof form a rectangular angle; and a transport member for supporting said support member and moving the same to a scanning exposure position and effecting the scanning exposure;

wherein said support member or said transport member is provided with an arc-shaped guide portion whereby said support member is rendered rotatable, along said guide portion, on the transport member, about the crossing point of said two scanning mirrors, and said scanning mirrors effect a rotating motion as well as a scanning motion at the scanning exposure.

DESCRIPTION OF THE PREFERRED EMBODIMENTS

Now the present invention will be clarified in detail by preferred embodiments thereof shown in the attached drawings.

[Embodiment 1] (FIGS. 1 to 4)

Figure 1:
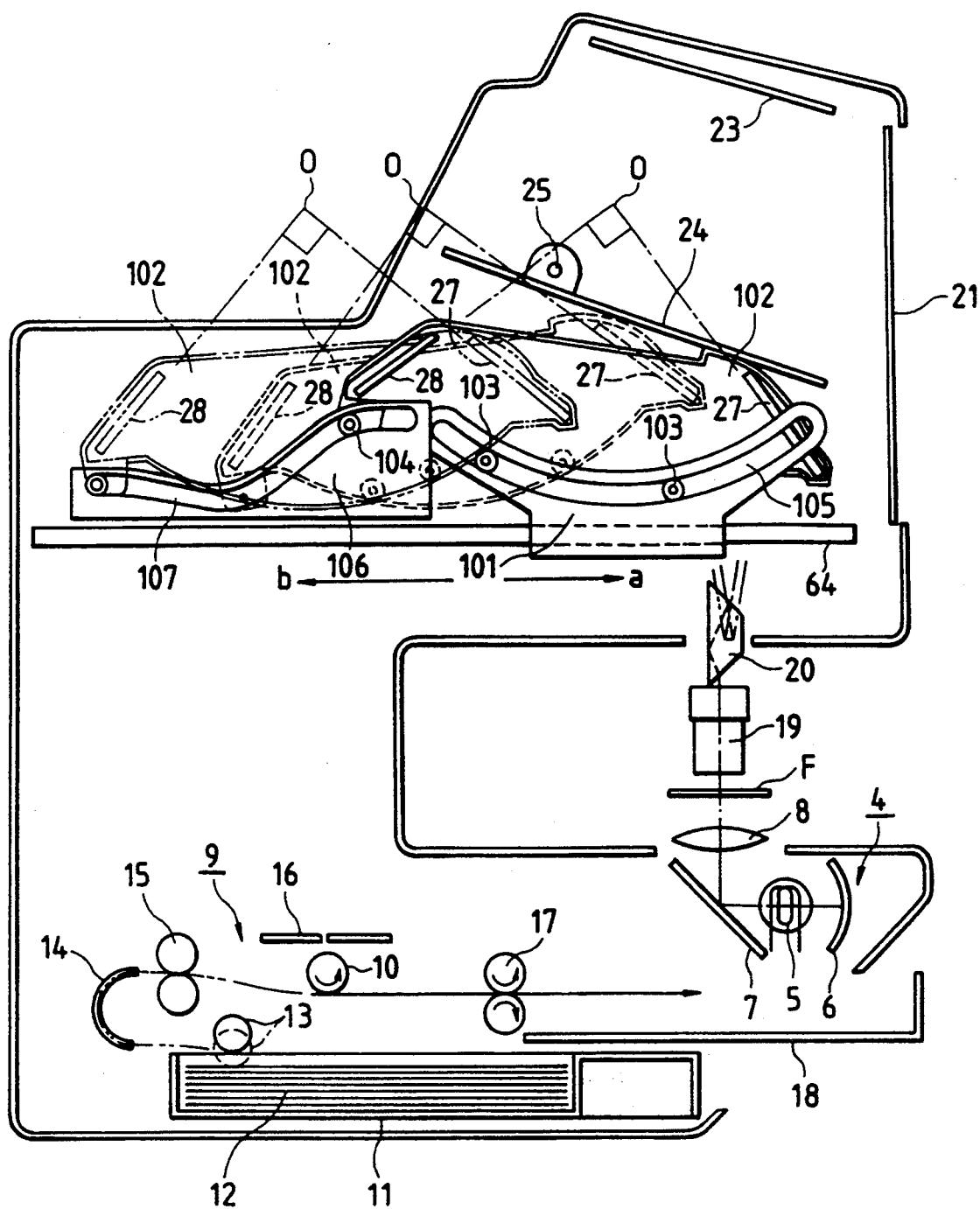
FIG. 1 is a view showing the function of an image scanning system in the printer mode, of a reader/printer constituting a first embodiment.
Figure 2:
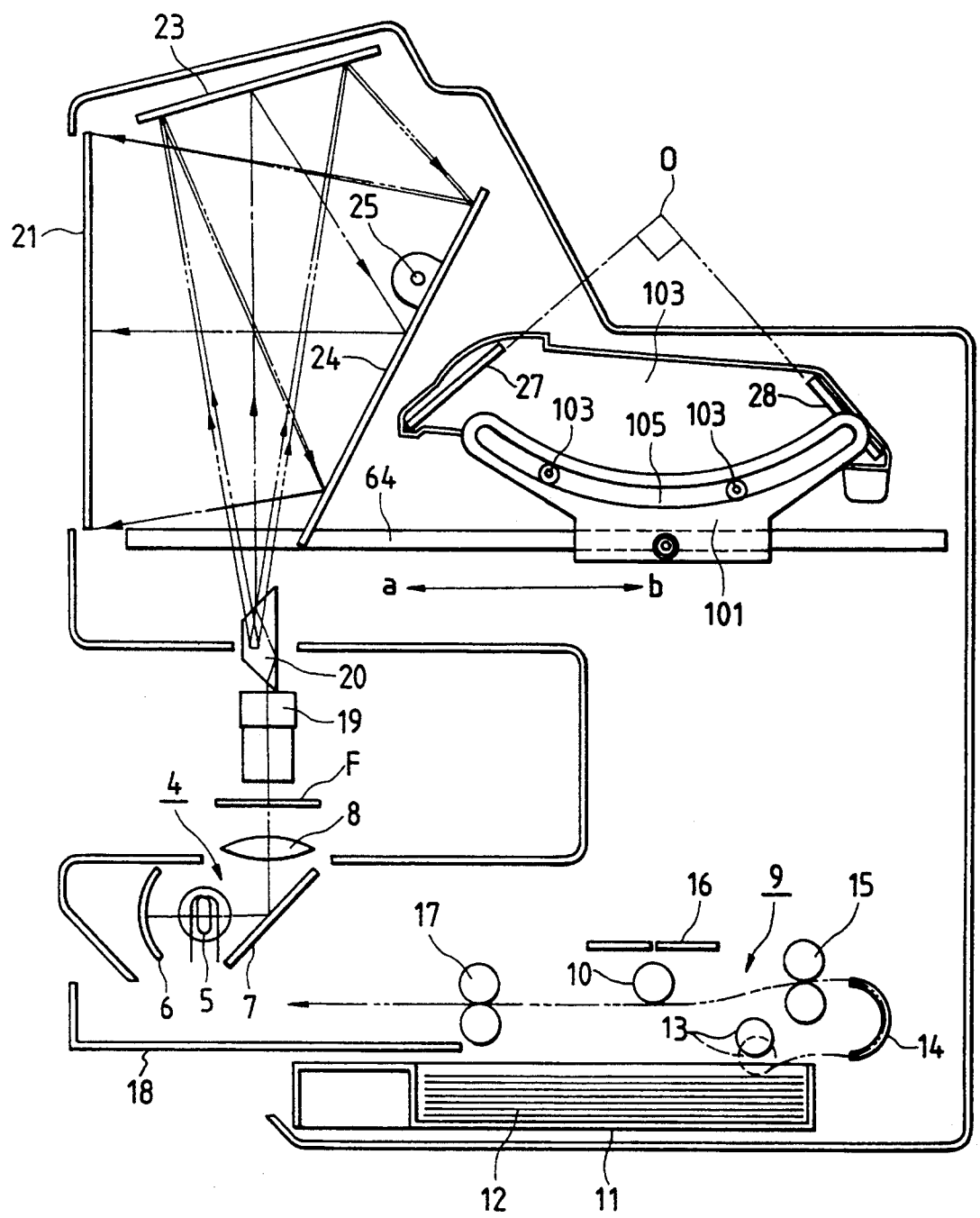
FIG. 2 is a view showing the state of the optical system in the reader mode.
Figure 3:
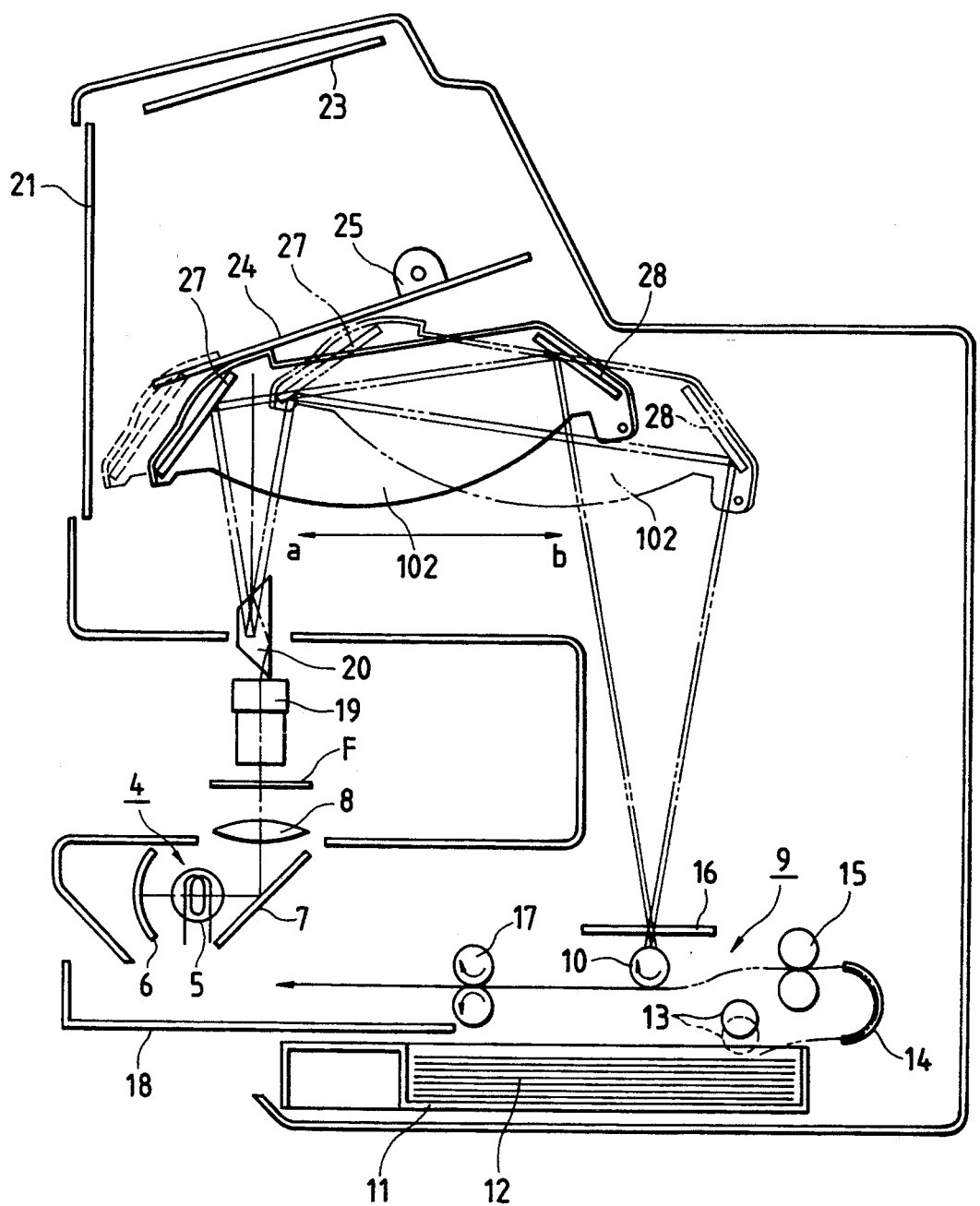
FIG. 3 is a view showing the function of the image scanning system in the printer mode.
Figure 4:
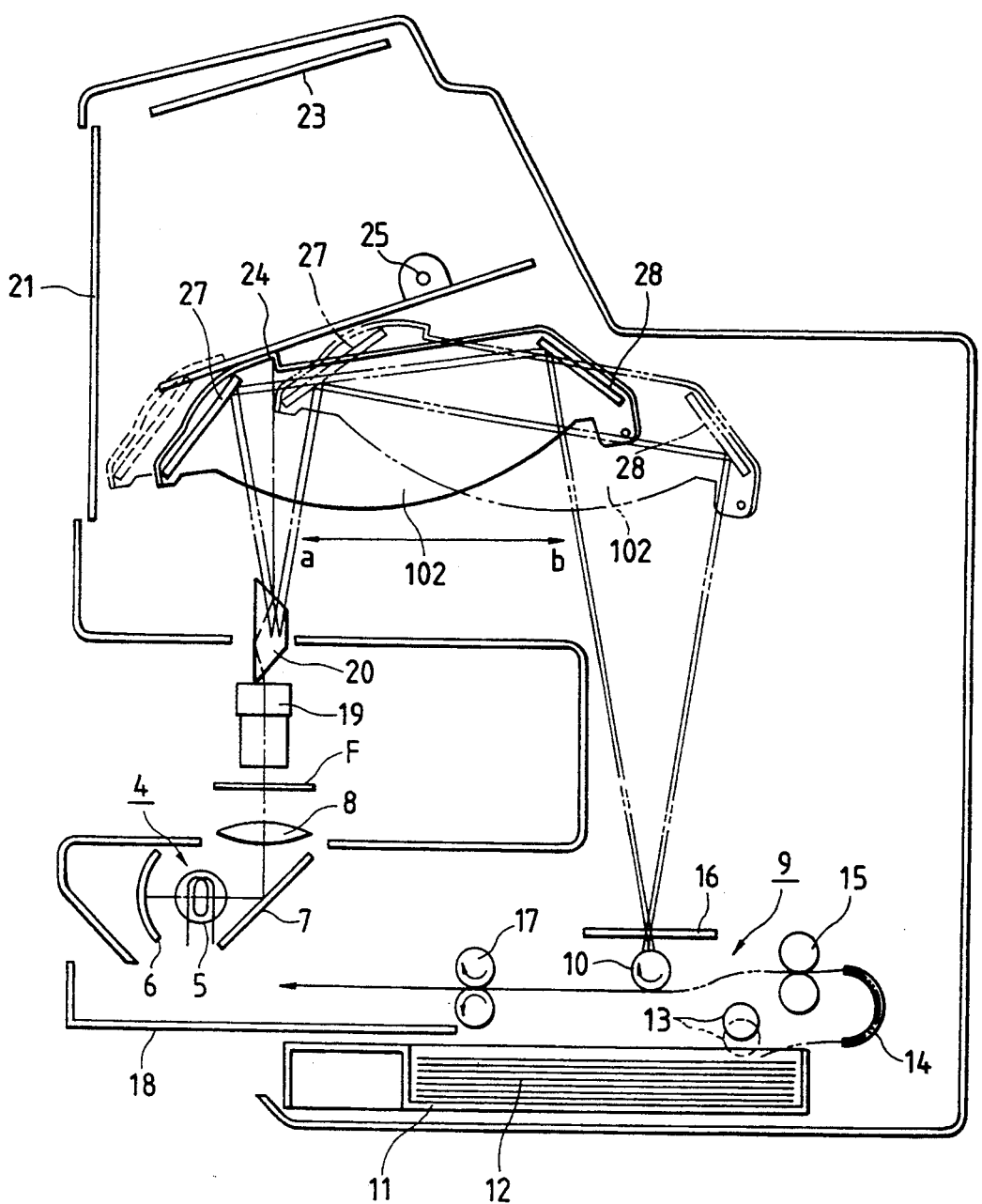
FIG. 4 is a similar view showing a state in which the image rotating prism is rotated by 180°.
Figure 15:
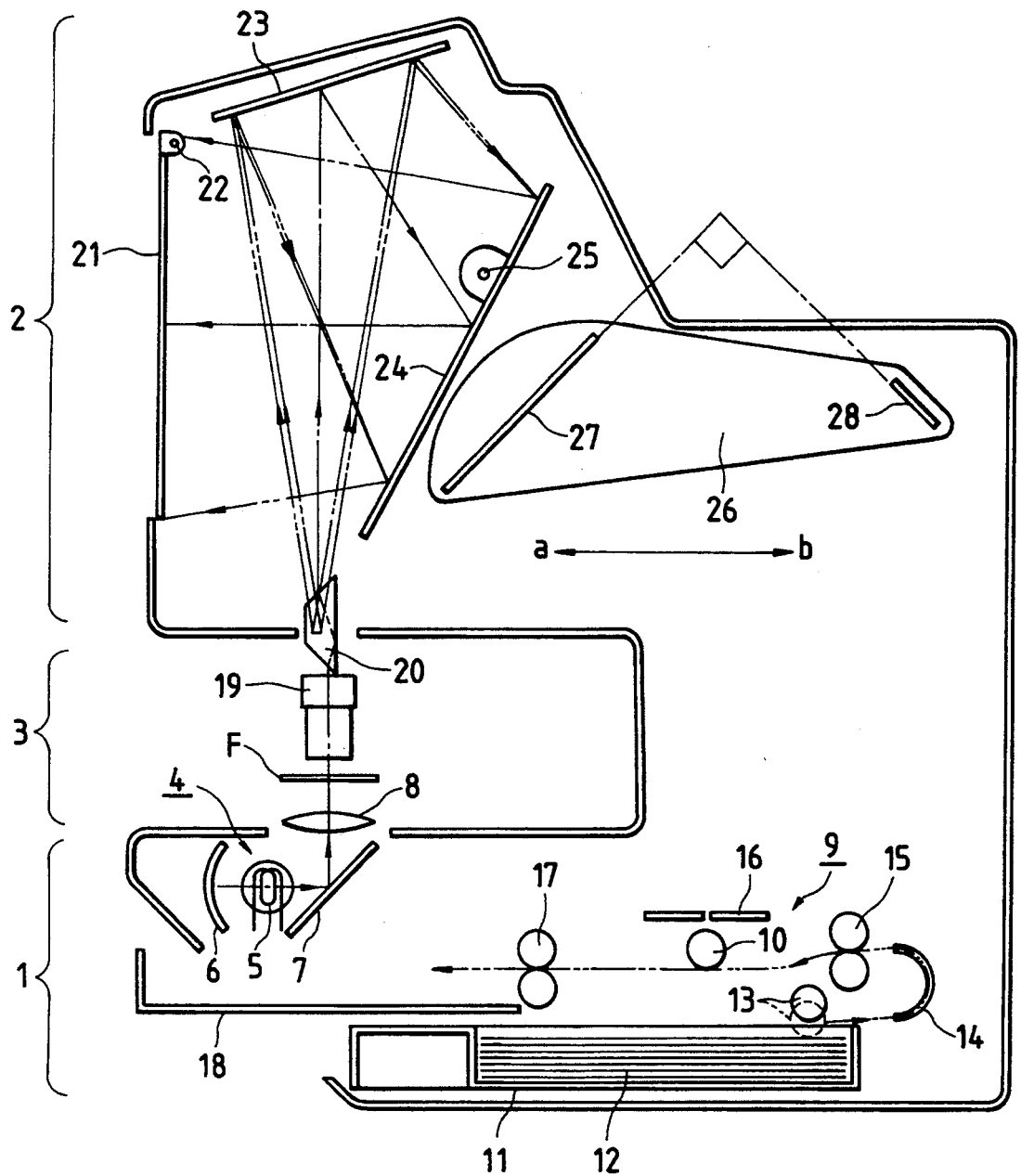
FIG. 15 is a view showing the state of an optical system in the reader mode in a conventional apparatus.
Figure 16:
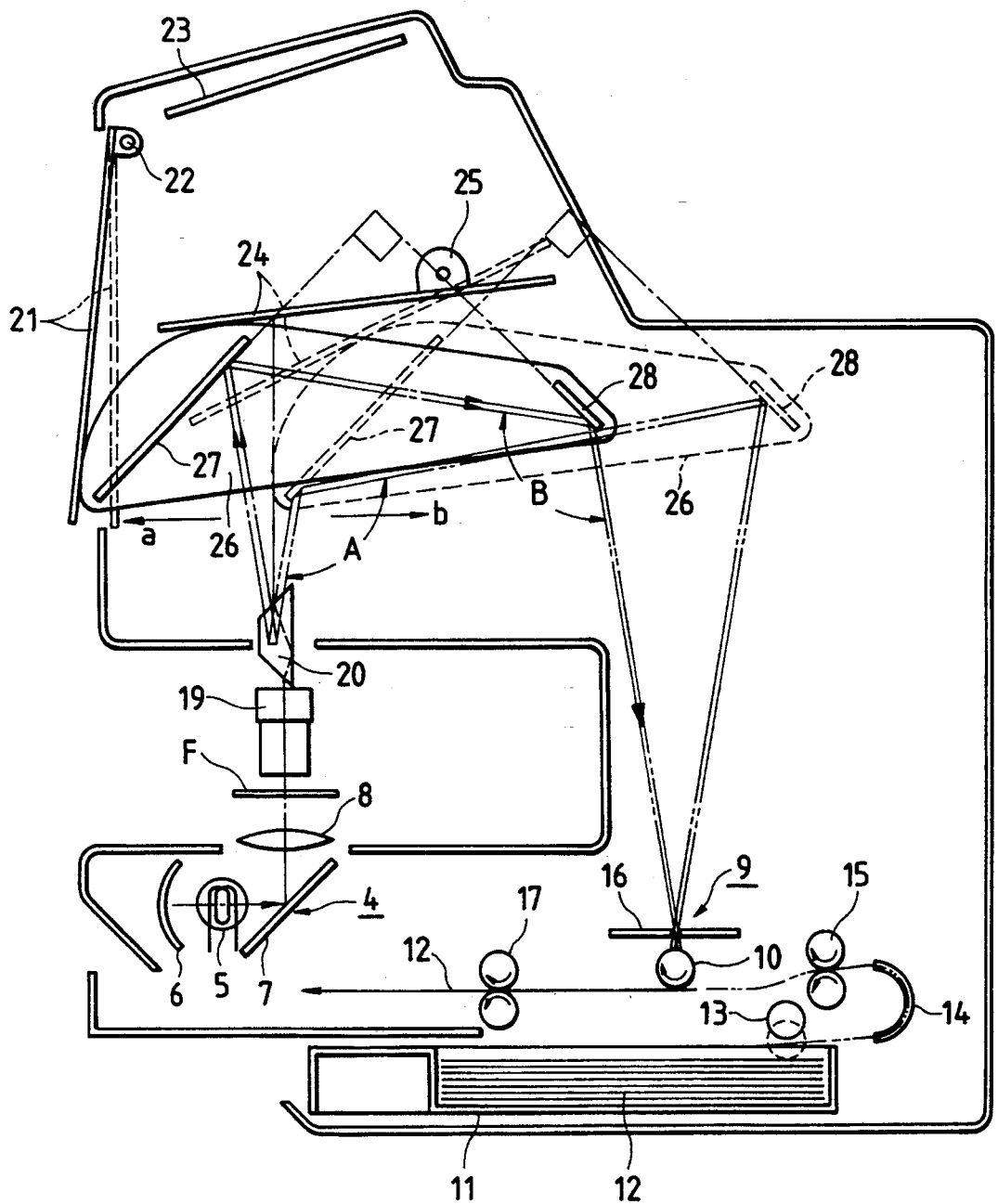
FIG. 16 is a view showing the function of an image scanning system in the printer mode in the conventional apparatus.

FIG. 1 illustrates the function of the image scanning system in the printer mode, in a reader/printer of this embodiment, and FIG. 2 illustrates the state of the optical system in the reader mode, wherein the reader/printer is seen from the opposite direction. Same components or parts as those in FIGS. 15 and 16 are represented by same numbers or symbols and will not be explained further. FIGS. 3 and 4 show the optical path in the printer mode, wherein the direction of the prism 20 is different by 180°.

A transport table 101 is driven by an unrepresented driving source (motor) and linearly moves in the forward and reverse directions a, b, along a guide shaft 64. A rocking (scanning) case 102, serves as a mirror supporting member for supporting the scanning mirrors 27, 28 of which reflecting faces mutually cross rectangularly. Said rocking case 102 is provided with four rollers (rocking members) 103 (two on each side), and said rollers are fitted in arc-shaped guide grooves 105 formed on the transport table 101. The movement of the rollers 103 along the guide groove 105 causes a rotating movement of the rocking case 102 along a guide face formed on the guide groove 105, which is formed as an arc, having the center at the crossing point O of the mirrors 27, 28.

Thus the radius of the guide groove 105 and the positions of the rollers 103 are so determined that the center of said rotating movement coincides with the crossing point O of the scanning mirrors 27, 28 of which reflecting faces mutually cross perpendicularly.

Also said rotating movement is so defined that the angle of reflection by the mirrors 27, 28 is always maintained at about 90° in the course of the scanning exposure.

The radius of the guide groove 105 and the positions of the rollers 103 can be selected in a number of ways. Also it is not necessary to provide two rollers on each side, but only one roller is enough on either side. Also the rollers may be replaced by a circular projection provided on the case 102.

A cam 106 is provided on the main body of the apparatus, and a control roller 104 provided on the rocking case 102 is fitted in a cam groove 107 of said cam 106 to control the rotary movement of the rocking case 102. With the movement of the transport table 101, the rocking case 102 moves along the guide groove 105 and effects the rotary motion with an angle determined by the cam groove 107. In the present embodiment, the shape of said cam groove 107 is so determined that the motion of the rocking case 102 in the course of the scanning exposure always provides a reflecting angle of about 90° by the scanning mirrors 27, 28 supported by said case.

Also the shape of said cam may be so modified as to cause an arbitrary motion of the rocking case 102.

In the reader/printer of the present embodiment, in the printer mode, the scanning mirrors 27, 28 which are mutually rectangularly supported by the rocking case 102, are made to effect a rotary motion in addition to a linear motion, whereby the first scanning mirror 27 can be made smaller. For this reason, it is rendered possible to prevent the interference between the rocking case 102 and the screen 21, without placing the screen 21 in a further forward position.

Also since the reflecting angle of each of the mirrors 27, 28 can be made small, it is rendered possible to maintain the reflecting angle of said two mirrors 27, 28 always at about 90° during the course of scanning exposure by rotating said mirrors at a suitable angle. Consequently it is made possible to prevent the image deterioration and the uneven image quality in the same copied image, resulting from the surface precision of the scanning mirrors 27, 28.

Also in the present embodiment, the retracting rotation of the second reader mirror 24, about the axis 25, from the path of the rocking case in the printer mode is achieved by pushing by the rotating motion of the rocking case 102, so that the reader mirror 24 can be smoothly rotated. In the present embodiment, the shape of the cam groove 107 is so determined that the rocking case 102:

(1) maintains the mirror 24 in the retracted position, shown in FIG. 1, without rotary motion, in the course of the scanning exposure;
(2) smoothly shifts the mirror 24 to said retracted position at the start of scanning exposure; and
(3) smoothly shifts the mirror 24 to the position of the reader mode, shown in FIG. 2, after the end of the scanning exposure.

In this manner undesirable influences on the image, resulting from vibration or load fluctuation caused by the rotary motion of the second reader mirror 24, are prevented, and the direct rotation of the mirror 24 by the rocking case 102 is thus rendered possible.

It is therefore no longer necessary to rotate said mirror 24 with another driving source, to employ a large motor for the driving source, or to employ a highly precise bearing in the shaft, and the apparatus can be made simpler, less expensive and more reliable.

In the present embodiment, the shape of said cam is so determined that, in the reader mode, the rocking case 102 is completely separated from the second reader mirror 24 and, in the home position, the rocking case 102 is rotated to a substantially horizontal state.

[Embodiment 2] (FIGS. 5 to 11B)

Figure 5:
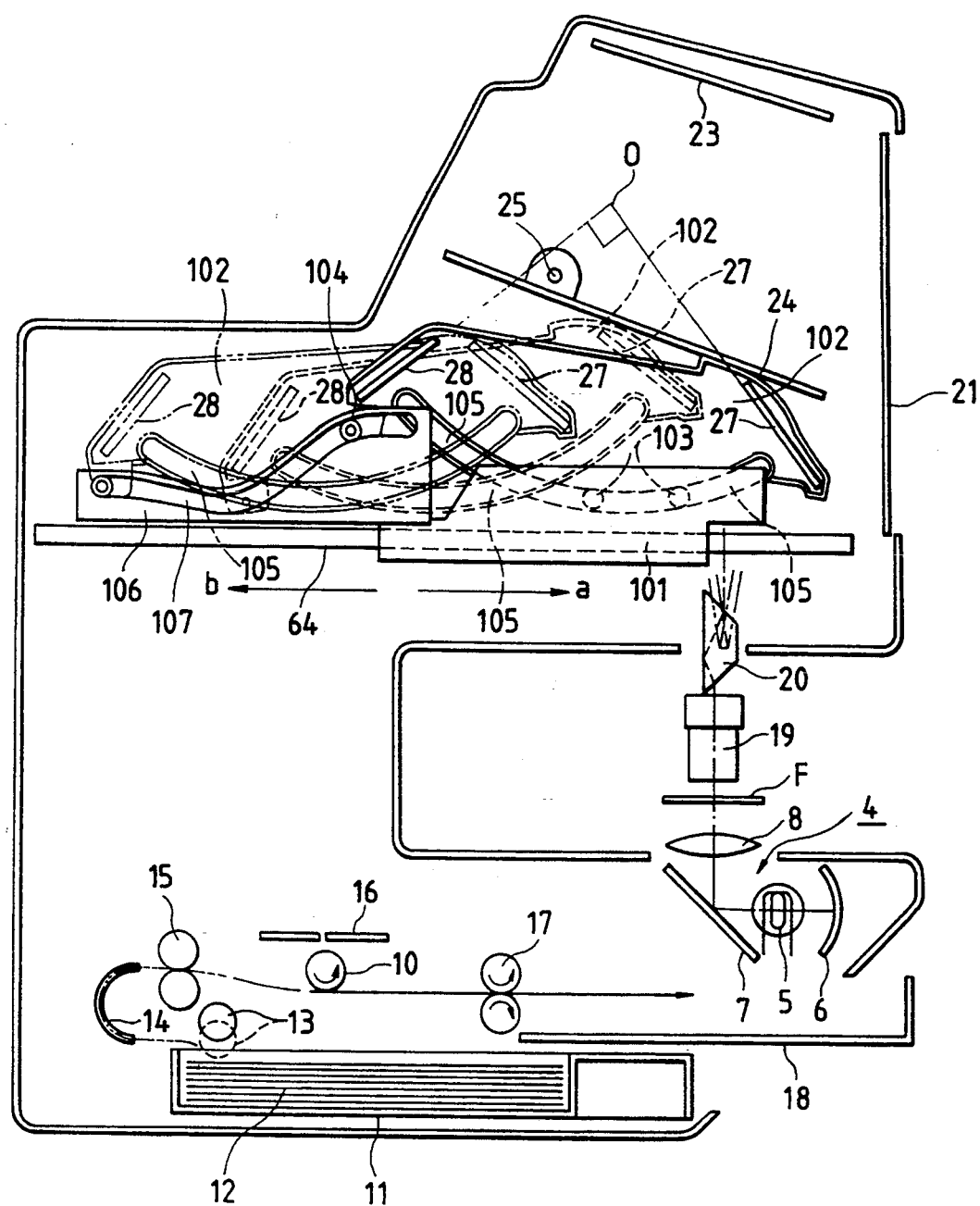
FIG. 5 is a view showing the function of an image scanning system in the printer mode, of a second embodiment.
Figure 6:
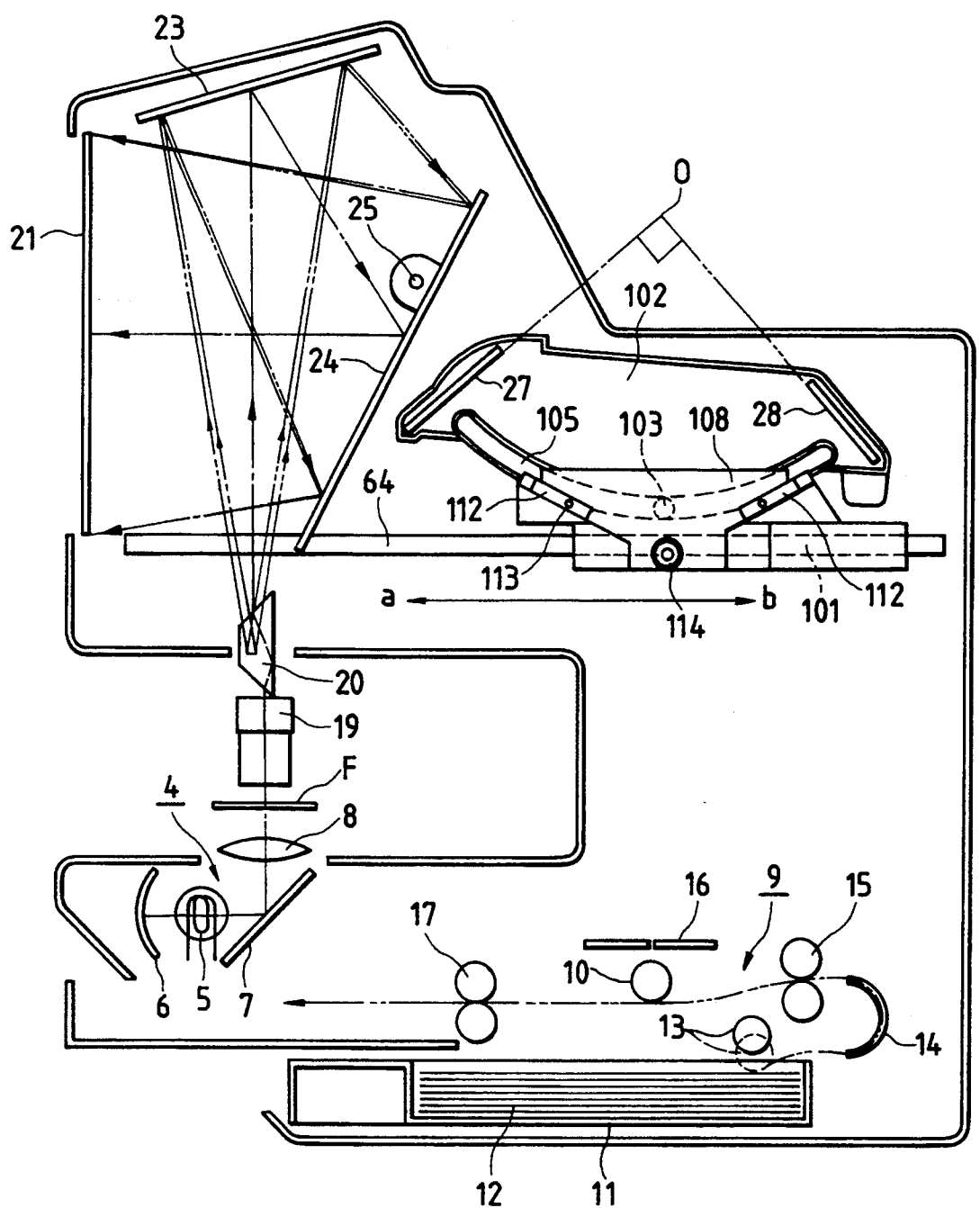
FIG. 6 is a view showing the state of the optical system in the reader mode.

FIG. 5 schematically shows the function of the image scanning optical system of the reader/printer of the present embodiment in the printer mode, and FIG. 6 schematically shows the state of the optical system in the reader mode.

In the present embodiment the guide groove 105 is provided on the rocking case 102, and the rollers 103 are provided on the transport table 101.

Since this configuration allows positioning of the first and second print mirrors 27, 28 and the arc-shape formation of the guide groove 105 within a same component, the crossing point O of the reflecting faces of the mirrors can be more precisely aligned with the center of the arc than in the foregoing first embodiment.

Figure 7:
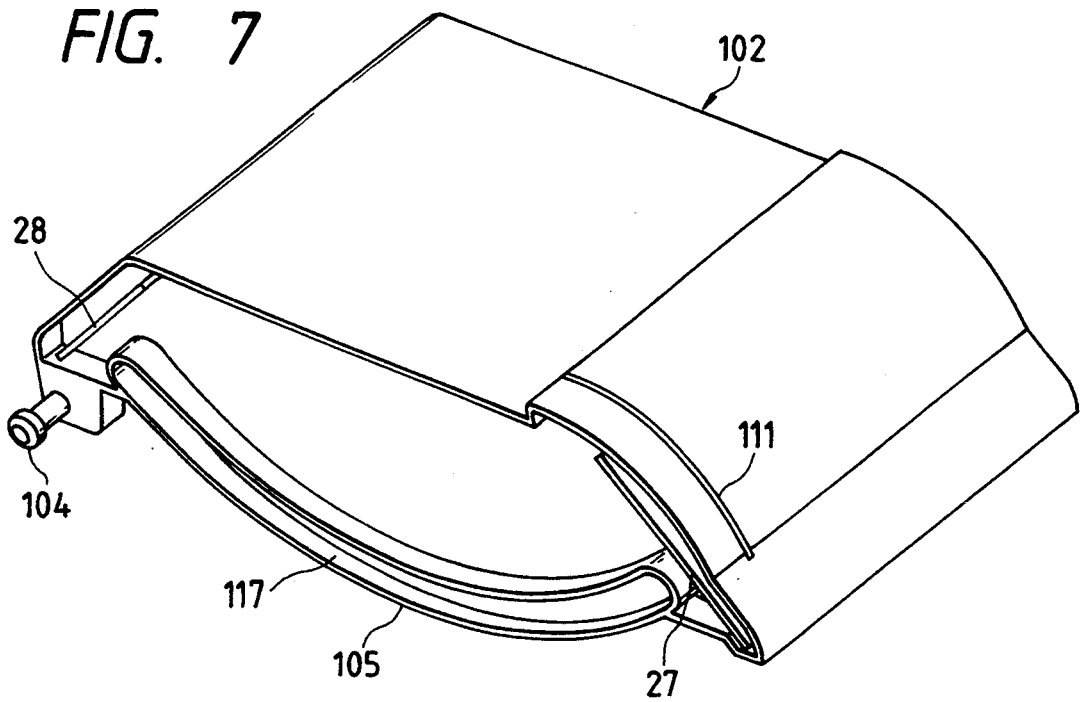
FIG. 7 is a perspective view of a vibrating case.
Figure 8:
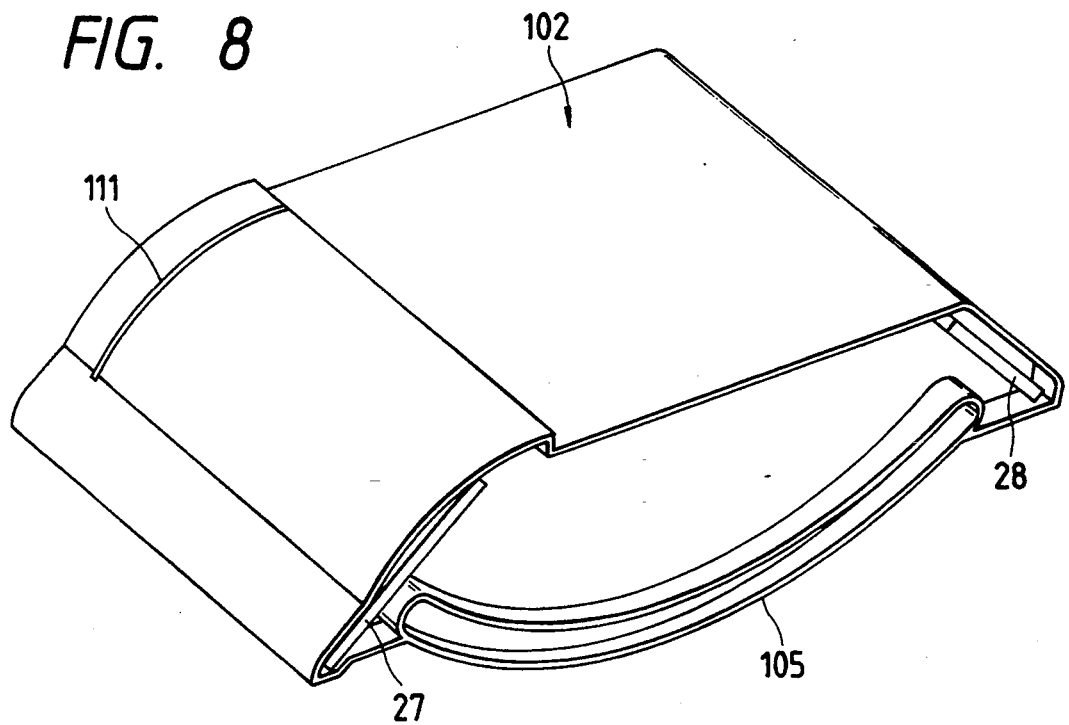
FIG. 8 is a perspective view of the same seen from the opposite direction.
Figure 9:
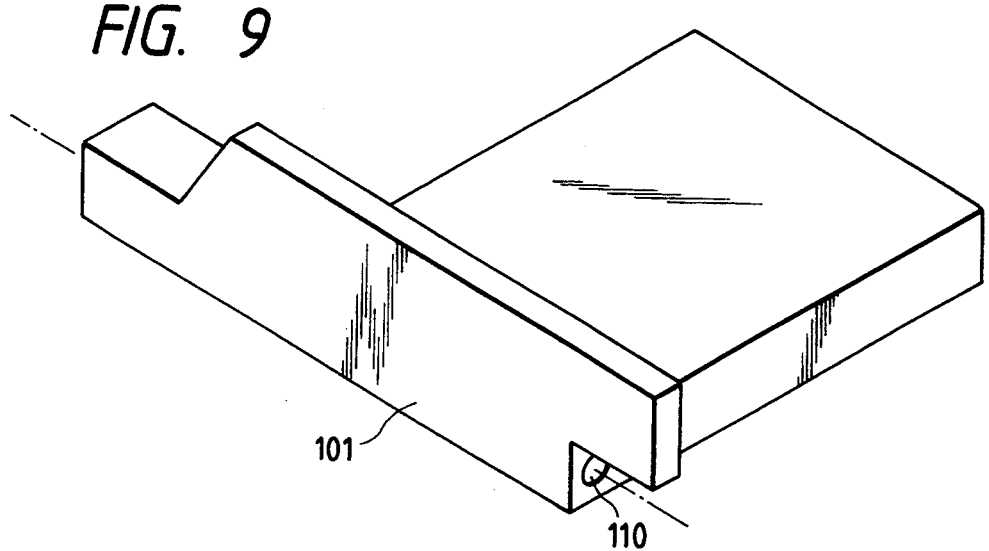
FIG. 9 is a perspective view of a transport member.
Figure 10:
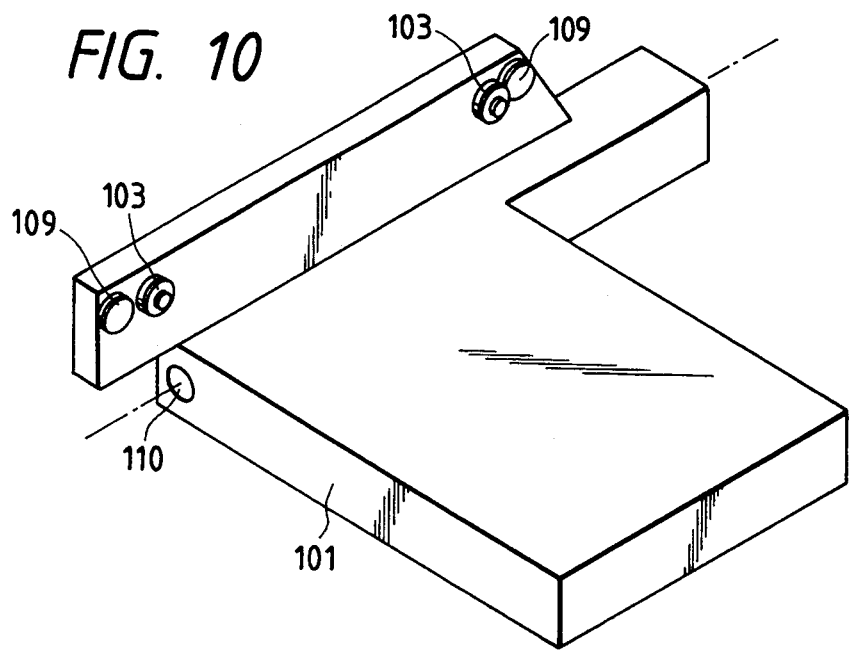
FIG. 10 is a perspective view of the same seen from the opposite direction.
Figure 11A:
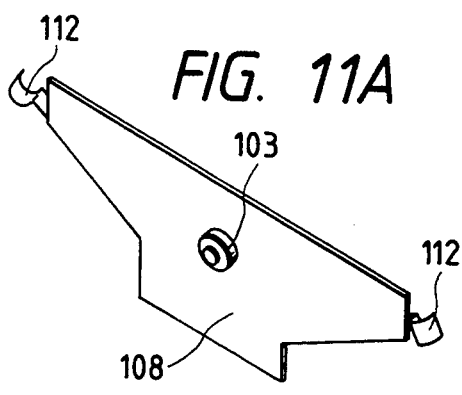
FIG. 11A is a perspective view of a laterally pushing member.

FIGS. 7 and 8 are perspective views of the rocking case 102 seen from mutually opposite directions; FIGS. 9 and 10 are perspective view of the transport table 101 seen from mutually opposite directions, and FIGS. 11A and 11B are perspective views of a laterally pushing member 108.

The rollers 103 (FIG. 10) of the transport table 101 and the roller 103 (FIGS. 11A) of the member 108 are fitted in the guide groove 105 of the rocking case 102 (FIGS. 7, 8), and then the transport table 101 and the member 108 are fixed by adhesion or by welding. Thus the rocking case 102 is rendered rotatable.

The transport table 101 is provided with guide pieces 109 of a low friction material, while the member 108 is provided with plate springs 112 fixed by screws 113, in order to guide or press the edge of the guide groove 105, whereby the lateral position of the rocking case 102 is determined.

Figure 11B:
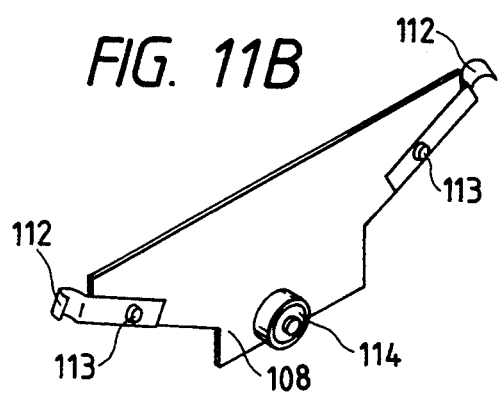
FIG. 11B is a perspective view of the same seen from the opposite direction.

In FIGS. 9, 10 there is shown a hole 110 for passing the shaft 64, and, in FIG. 11B, there is shown a roller 114 for reducing friction when the transport table 101 passes on an unrepresented rail plate.

Figure 12A:
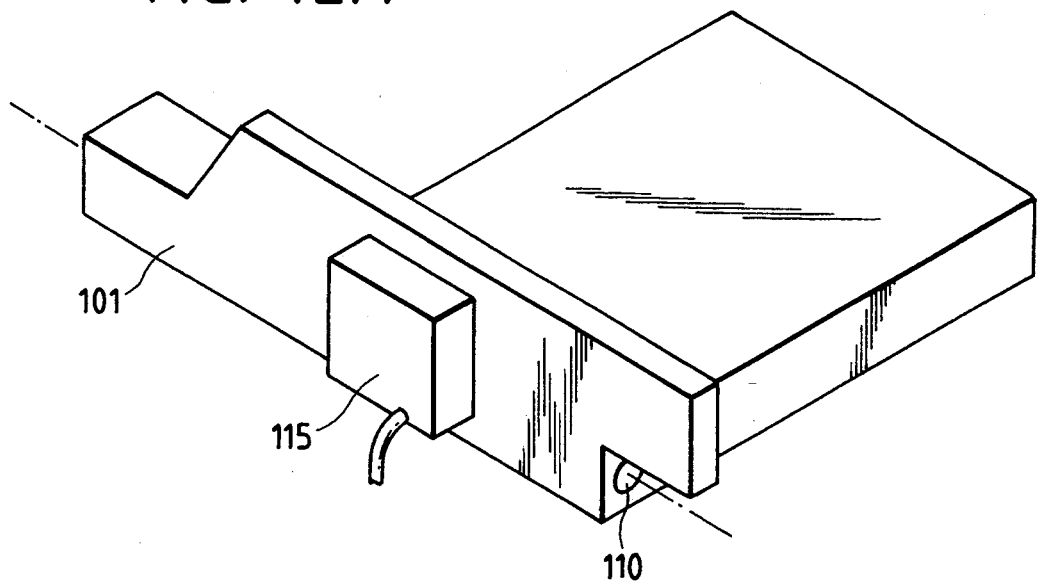
FIG. 12A is a perspective view of a transport member in the apparatus of a third embodiment.
Figure 12B:
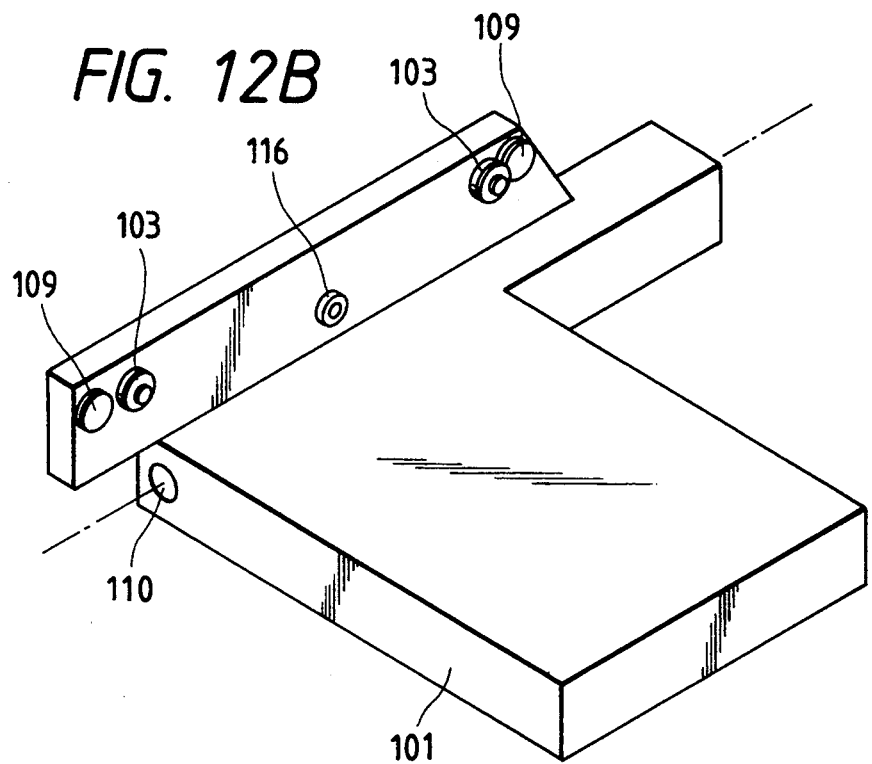
FIG. 12B is a perspective view of the same seen from the opposite direction.

[Embodiment 3] (FIGS. 12A and 12B)

FIGS. 12A and 12B are schematic views of a transport table 101 of the present embodiment, wherein a friction roller, mounted on the shaft of a small DC motor 115, is in pressure contact with the internal periphery 117 of the guide groove 105 of the foregoing second embodiment, shown in FIGS. 7 and 8. In this embodiment the rocking case 102 is rotated by the motor 115.

This embodiment allows to further simplify the configuration of the apparatus, because the cam member 106, constituting a large volume in the first embodiment, can be dispensed with.

Figure 13:
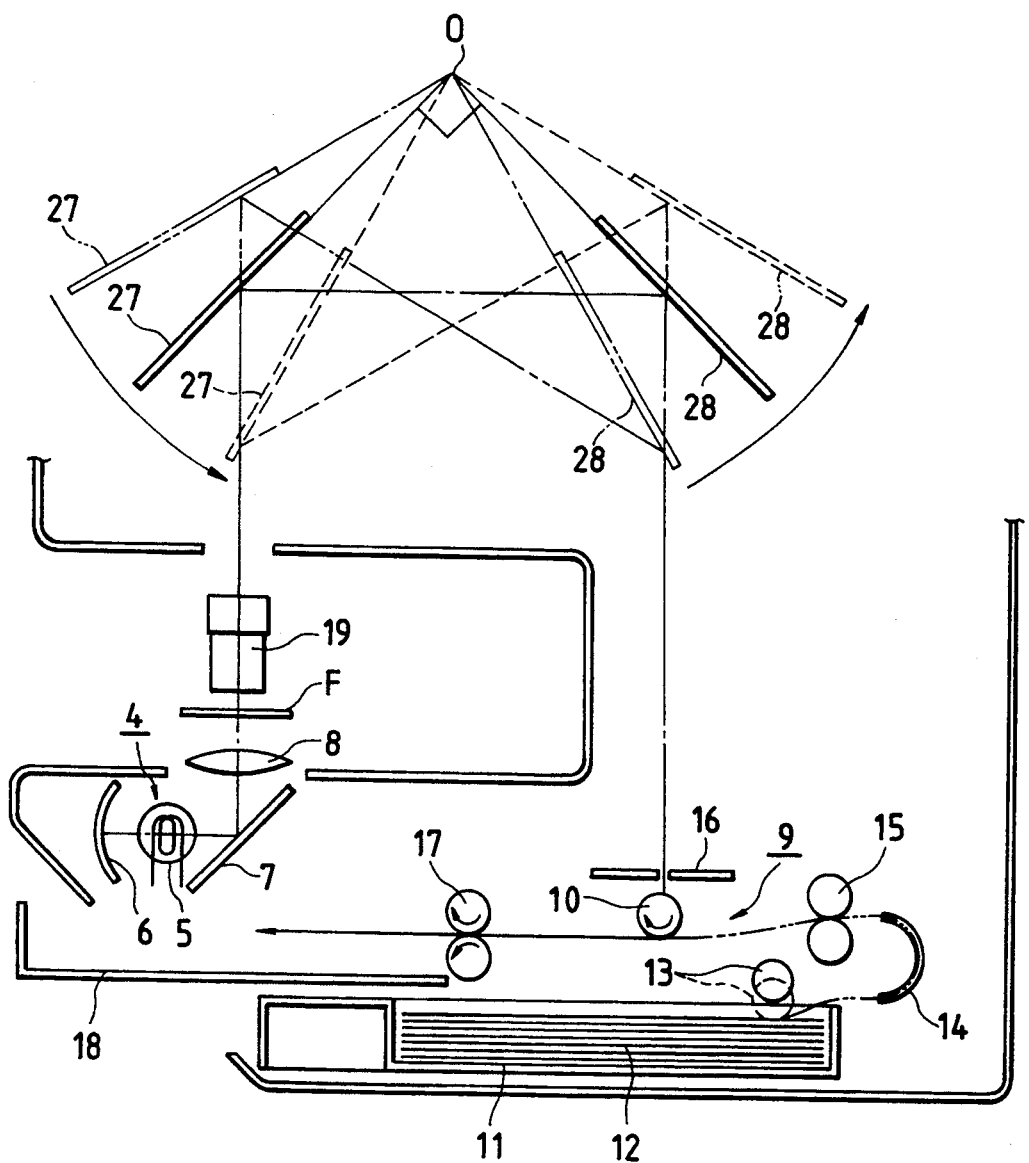
FIG. 13 is a view showing the working principle of a rotary scanning system.

In the following there are explained the effects of the present invention.

a) The present invention utilizes, in the scanning of an image, a geometrical optical property that, if two scanning mirrors 27, 28 are mutually supported perpendicularly as shown in FIG. 13, the incident optical axis to the photosensitive drum 10 remains constant and the distance between the optical axes remains also constant when said mirrors are rotated about the crossing point O of the reflecting faces thereof.

Figure 14:
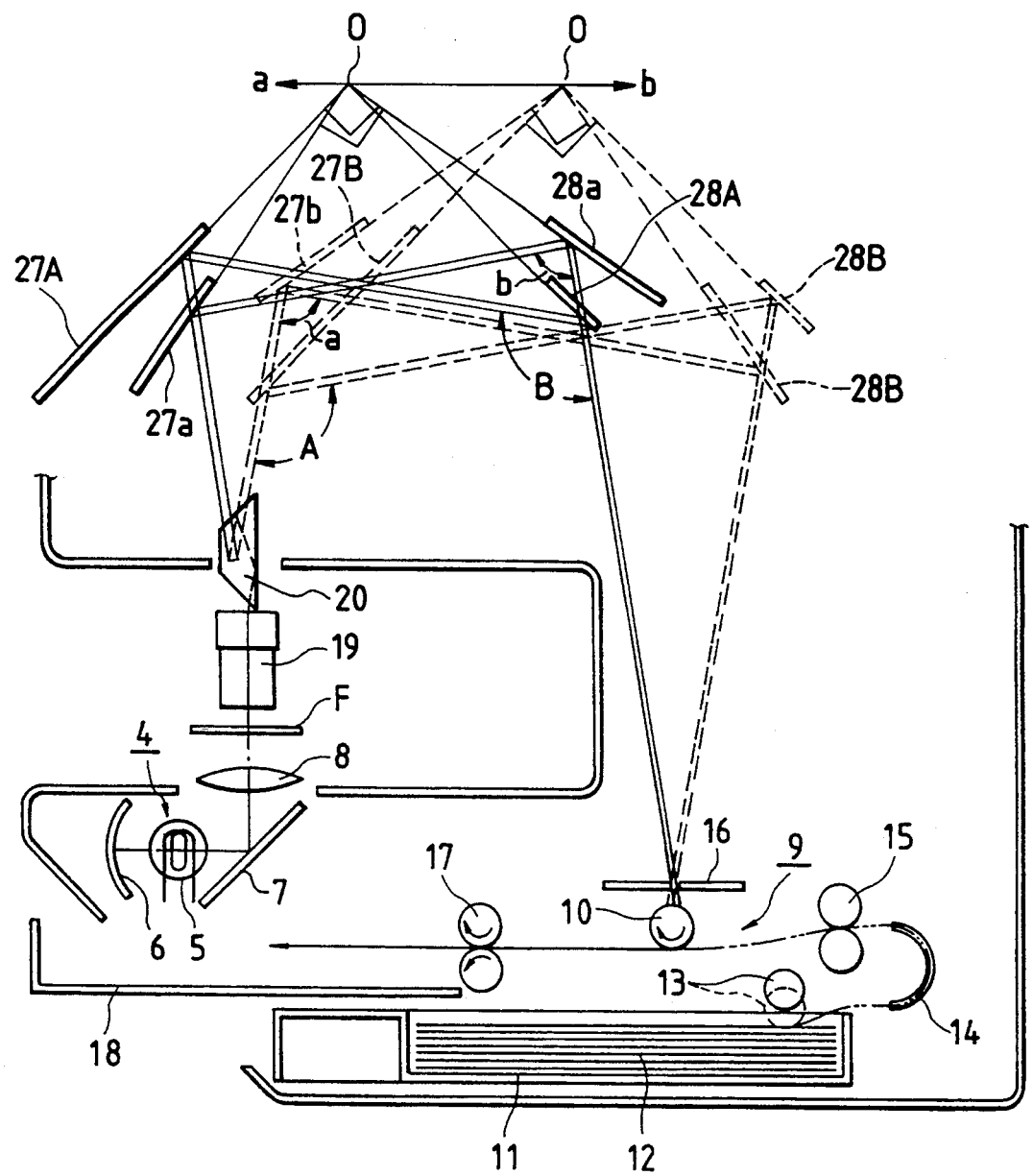
FIG. 14 is a view showing the function and effect of the rotary scanning system.

FIG. 14 illustrates the effect obtained by said property. If the mirrors 27, 28 effect the linear scanning motions only, there will be required mirror widths as represented by 27A, 27B, 28A and 28B. By adding the rotating motion, about the crossing point O of the reflecting faces of the mirrors 27, 28, to said linear motion, said mirror widths required for scanning can be modified as represented by 27a, 27b, 28a and 28b.

The front mirror 27 can thus be made smaller, so that the interference can be eliminated between the front end portion of the scanning case advanced to the exposure start position and the screen, without placing said screen in a further front position.

b) Also if the scanning mirrors 27, 28 effect a linear scanning motion only, said mirrors 27, 28 provide blunt reflecting angles A, B as already explained in relation to FIG. 16. However, said reflecting angles can be made smaller as represented by a, b in FIG. 14, by adding the rotating motion, about the crossing point O of the reflecting faces of said mirrors, to said linear motion.

Said reflecting angles can be always maintained at about 90° during the scanning exposure, by rotating said mirrors to a suitable position, and there can be thus prevented the image deterioration and the uneven image quality within a copied image, resulting from the surface precision of the scanning mirrors 27, 28.

c) When the optical path in the reader mode is switched to that in the printer mode by pushing the mirror, constituting the optical path in the reader mode, with the moving scanning case which supports the scanning mirrors, said scanning case effects a rotating motion in addition to a linear scanning motion so as to maintain said optical path constituting mirror in a retracted position during the scanning exposure regardless of the movement of said scanning case, thereby preventing undesirable influences of vibration or load fluctuation resulting from the rotation of said optical path constituting mirror. It is therefore no longer necessary to employ another driving source for the optical path constituting mirror, and the apparatus can be made simpler, less expensive and more reliable.

As explained in the foregoing, the present invention can provide an image projection apparatus with reader mode and printer mode, which is of a simple and compact configuration, a lower cost, improved operability and is capable of providing a copied image of high quality.

What is claimed is:

1. An image projection apparatus switchable between a reader mode in which an image is projected on an screen and a printer mode in which the image is projected on an exposure position, comprising:
   an imaging lens;
   first optical means for guiding image bearing light, formed by said imaging lens, to a screen;
   second optical means for guiding the image bearing light, formed by said imaging lens, to the exposure position, said second optical means including two mirrors which are mutually perpendicularly positioned;
   a support member supporting said two mirrors and capable of a rotating motion;
   a transport member rotatably supporting said support member and movable in a direction crossing the optical path of said imaging lens; and
   an arc-shaped guide member provided on said support member or on said transport member and serving to cause a rotating motion of said support member.

2. An apparatus according to claim 1, wherein said guide member has an arc-shaped guide face having a center at the crossing point of said mirrors, and said support member rotates along said guide face.

3. An apparatus according to claim 2, wherein said support member rotates along said guide face, during the movement of said transport member.

4. An apparatus according to claim 1, wherein said support member is provided above said transport member.

5. An apparatus according to claim 1, wherein said guide member is provided on either of said support member and said transport member, while a sliding member is provided on the other, whereby the movement of said sliding member along said guide member causes rotating motion of the support member.

6. An apparatus according to claim 1, further comprising means for controlling the rotating angle of said support member.

7. An apparatus according to claim 6, wherein said control means controls the rotating angle of said support member in such a manner that each of said mirrors provides a reflecting angle of about 90° during the movement of said transport member.

8. An apparatus according to claim 7, wherein said control means includes a cam member, and, with the movement of the transport member, the support member effects the rotating motion while moving along the cam face of the cam member.

9. An apparatus according to claim 1, wherein said first optical means includes a rotatable mirror for the reader mode, which is movable between an active position in the optical path of said imaging lens and an inactive position outside said optical path.

10. An apparatus according to claim 9, wherein said rotatable mirror for the reader mode is moved between said active position and said inactive position, in response to the movement of said support member.

11. An apparatus according to claim 10, wherein said rotatable mirror rotates by engaging said support member.

12. An apparatus according to claim 1, wherein said support member is adapted to rotate about said crossing point, and effects a rotating motion in response to the movement of the transport member.

13. An apparatus according to claim 12, wherein one of said two mirrors enters the optical path of said imaging lens or is retracted therefrom in response to the movement of said transport member, and, when said one of said two mirrors enters the optical path, the image bearing light formed by said imaging lens is projected to the exposure position by means of said two mirrors.

14. An image projection apparatus switchable between a reader mode in which an image is projected on a screen and a printer mode in which the image is projected on an exposure position, comprising:
   an imaging lens;
   first optical means for guiding image bearing light, formed by said imaging lens, to the screen;
   second optical means for guiding the image bearing light, formed by said imaging lens, to the exposure position, said second optical means including two mirrors which are mutually perpendicularly positioned;
   a support member supporting said two mirrors;
   a transport member movably positioned between said support member and said imaging lens, and rotatably supporting said support member;
   drive means for moving said transport member in a direction crossing the optical path of said imaging lens; and
   a guide member having an arc-shaped face having the center at the crossing point of said two mirrors and adapted to rotate said support member along said arc-shaped face.

15. An apparatus according to claim 14, wherein said guide member is provided on said support member.

16. An apparatus according to claim 14, wherein said guide member is provided on said transport member.

17. An image projection apparatus switchable between a reader mode in which an image is projected on a screen and a printer mode in which the image is projected on an exposure position, comprising:
   an imaging lens;
   first optical means for guiding image bearing light, formed by said imaging lens, to the screen;
   second optical means for guiding the image bearing light, formed by said imaging lens, to the exposure position, said second optical means including two mirrors which are mutually perpendicularly positioned;
   a support member supporting said two mirrors;
   means for moving said support member in a direction crossing an optical path of said imaging lens to scan the image by said two mirrors; and
   rotating means for rotating said support member during a movement of said support member in the direction crossing the optical path of said imaging lens, said rotating means including a curved guide face extended in the direction of movement and a movement body moving along said guide face, said support member being rotated by said movement body being moved along said guide face.

18. A reader/printer comprising:
   a screen;
   an imaging lens;
   a rotatable mirror for a reader mode, for guiding image bearing light, formed by said imaging lens, to the screen, wherein said mirror is positioned in the optical path of said imaging lens in the reader mode;
   two mirrors for a printer mode, which are mutually perpendicularly positioned, for guiding the image bearing light, formed by said imaging lens, to an exposure position, wherein said mirrors are positioned, in the reader mode, outside the optical path of said imaging lens and are positioned behind the rotatable mirror for the reader mode;
   a support member supporting said two mirrors for the printer mode;
   means for moving said support member in a direction crossing the optical path of said imaging lens to scan the image by said two mirrors;
   means for rotating said support member in accordance with a movement of said support member; and
   an engagement member disposed on said support member, the engagement member engaging, while rotating, said rotatable mirror in accordance with the movement of said support member and rotating said rotatable mirror.

19. A reader/printer according to claim 18, wherein said rotating means comprises a shaped guide face, and said support member is rotated by being guided along said guide face.

* * * * *